Feb. 8, 1955     T. G. LAWRENCE     2,701,704
AUTOMATIC CUTOFF VALVE
Filed Oct. 26, 1951
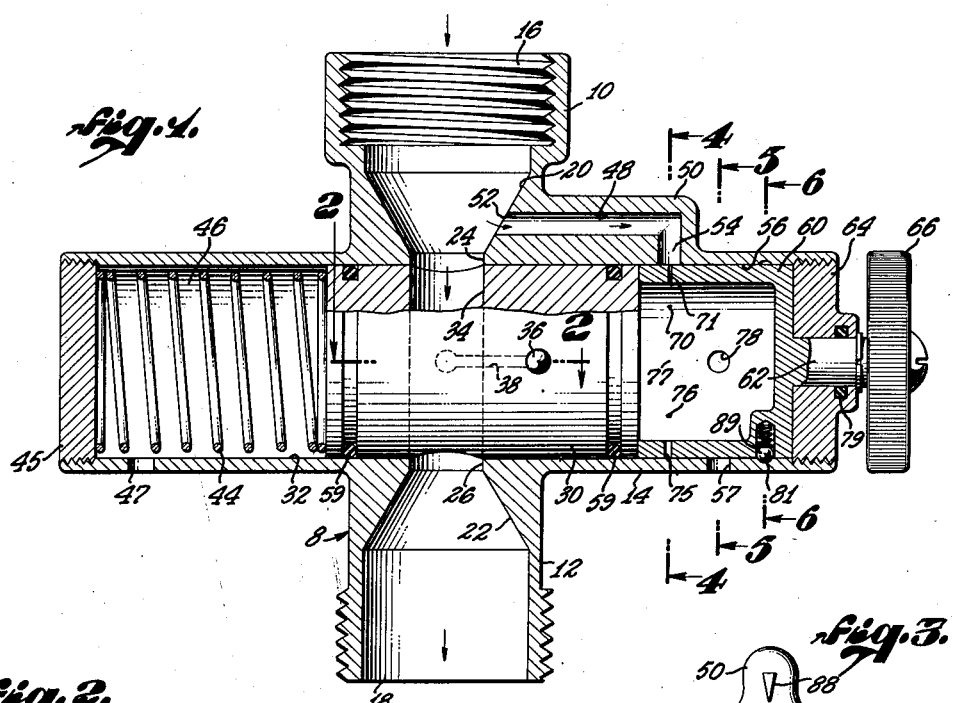
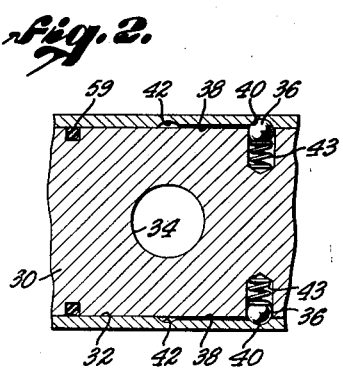
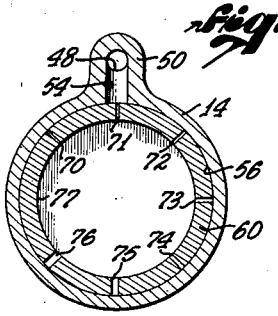
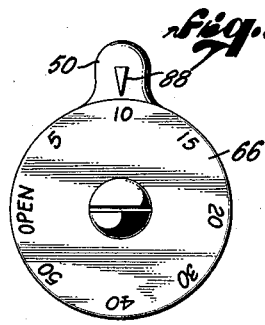
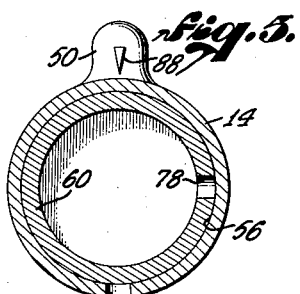
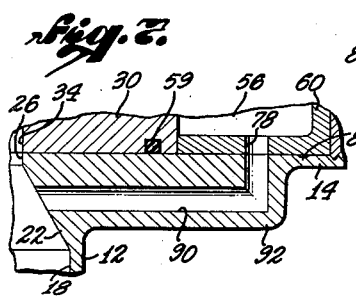
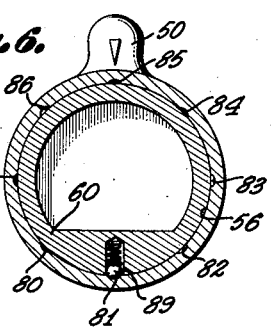
THEODORE G. LAWRENCE,
INVENTOR.
BY
*Reed Lawlor*
ATTORNEY.

United States Patent Office 2,701,704
Patented Feb. 8, 1955

2,701,704

AUTOMATIC CUTOFF VALVE

Theodore G. Lawrence, Long Beach, Calif.

Application October 26, 1951, Serial No. 253,261

7 Claims. (Cl. 251—25)

My invention relates to improvements in fluid control valves and more particularly to an improved automatic cutoff valve.

An object of my invention is to provide an improved cutoff valve which operates after a predetermined quantity of fluid has flowed therethrough.

Another object of my invention is to provide such an automatic cutoff valve which is of simple mechanical construction and of low manufacturing cost.

The foregoing and other objects and advantages of my invention will become apparent from the following description taken in connection with the accompanying drawing, wherein:

Figure 1 is a cross-sectional view of my improved automatic cutoff valve;

Fig. 2 is a cross-sectional view taken on the line 2—2 of Fig. 1;

Fig. 3 is an end view of the adjusting dial;

Fig. 4 is a cross-sectional view taken on the line 4—4 of Fig. 1;

Fig. 5 is a cross-sectional view taken on the line 5—5 of Fig. 1;

Fig. 6 is a cross-sectional view taken on the line 6—6 of Fig. 1; and

Fig. 7 is a detailed view of an alternative form of my invention.

Referring to the drawing and more particularly to Figure 1, there is illustrated an automatic cutoff valve 8 embodying my invention and comprising a cross-shaped valve body 10 and a valve plunger 30. According to my invention, the valve 8 is so designed that when it is connected in a line through which a liquid or other fluid is flowing, the pressure grows in an auxiliary pressure chamber at such a rate that the plunger 30 is operated to shut off the valve after a predetermined time interval. According to my invention, the predetermined time interval varies as an inverse function of the rate of fluid flow so that over a substantial range of fluid flow rate, the valve cuts off after a predetermined quantity of liquid has flowed through the line. If the flow rate is always the same, the valve, in effect, is a time-control valve. However, since compensation for flow rate or line pressure occurs, the valve is particularly adapted to shut off a sprinkler system automatically or any other system in which it is desired that a given quantity of fluid pass through the valve before the valve is automatically closed.

The body 10 comprises a vertical arm 12 and a horizontal arm 14 substantially bisecting each other. The vertical arm 12 is provided with a female thread at its inlet 16 and a male thread at its outlet 18 to adapt it for connecting in a flow line. The inlet 16 and the outlet 18 include conical tapering portions 20 and 22 respectively, which converge toward the center of the body and which terminate in inlet and outlet mouths 24 and 26 respectively, the conical portions, the mouths and the threaded portions being coaxial.

The horizontal cross-arm 14 is of tubular configuration, forming a cylindrical valve chamber 32 and the valve plunger 30 is of cylindrical configuration so that the valve plunger is adapted to reciprocate within the valve chamber 32 enclosed by the cross-arm. The valve plunger 30 is provided with a transverse passage 34 which is arranged to register with the mouths 24 and 26 when the valve is open and which may be moved aside so that the valve plunger 30 cuts off the mouths 24 and 26 when the valve is closed.

Alignment of the passage 34 with the axis of the mouths 24 and 26 is assured by means of a guide constituting ball detents 36 carried by the valve plunger 30 and internal grooves 38 formed in the inner wall of the cross-arm 14, as illustrated in Fig. 2. The grooves 38 are formed with sinks 40 and 42 at the opposite ends thereof into which the ball detents 36 are pressed by springs 43 to lock the plunger in either the open or the closed position. The sinks 40 are relatively large and the sinks 42 are relatively small for reasons which will become apparent hereinafter.

A helical compression spring 44 is retained by a plug 45 within the left portion 46 of the valve chamber 32 on the left side of the valve plunger 30. The spring 44 is normally compressed to some extent and is adapted to urge the valve plunger 30 into its open position in which the passage 34 is registered with the mouths 24 and 26. In this position, the ball detents 36 engage the sinks 40 at the right ends of the grooves 38. An outlet 47 is provided to permit discharge of any fluid from the left portion 46 of the valve chamber.

A passage 48 formed in a blister 50 of the valve body 10 provides communication between the inlet 16 and the right portion 56 of the valve chamber 32, the passage being formed with a mouth 52 opening into the wall of the conical portion 20 above the inlet mouth 24 and a lateral opening 54 establishing the communication with the right portion of the valve chamber. A lateral opening 57 is formed on the lower side of the cross-arm 14 to permit discharge of liquid from the right portion 56 of the valve chamber, as explained more fully hereinbelow. The discharge opening 57 is offset from the lateral opening 54 for purposes which will become apparent hereinafter. O-rings 59 or other suitable means seal the ends of the valve plunger 30 on opposite sides of mouths 24 and 26.

A rotary thimble-shaped valve 60 is mounted within the right portion 56 of the valve chamber, this valve being rotatably mounted upon a horizontal shaft or stem 62 journalled in and projecting through a plug 64 at the right end of the cross-arm 14. A knurled dial 66 mounted at the external end of the shaft 62 is employed for rotating the valve 60 into any desired position.

As shown in Fig. 4, the valve 60 is provided with a series of orifices 70, 71, 72, 73, 74, 75, and 76 of progressively increasing cross-section, the orifices being mounted in a common plane passing through the center of the upper lateral opening 54. The openings are spaced apart by equal angles of 45°, leaving one blank position 77 bearing no orifice. As shown in Fig. 5, the valve 60 also comprises a discharge orifice 78 that is diametrically opposite the blank space 77 but is displaced axially therefrom to a position where it may register with the discharge opening 57. An O-ring 79 seals the shaft 62.

A ball detent 89, as shown in Figs. 1 and 6, is arranged to engage a series of eight equally spaced recesses 80, 81, 82, 83, 84, 85, 86, and 87. The ball detent 89 and the recesses 80 . . ., 87 are so arranged that when the ball detent 89 engages the recesses 80 . . ., 86, the orifices 70 . . ., 76 respectively are registered with the lateral opening 54, but when the ball detent 79 engages the recess 87, the discharge orifice 78 is registered with the discharge opening 57 and the blank space 77 blocks the lateral opening 54.

As shown in Fig. 3, the dial 66 carries a suitable legend "open" to indicate when the discharge orifice 78 is registered with the opening 57 and other suitable legends, such as the numbers 5, 10, 15, 20, 30, 40, and 50 to correspond with the various openings 70 . . . , 76 inclusive so as to indicate which of these openings is registered with the lateral passage 54. In the arrangement illustrated, the valve position is indicated by that portion of the dial which is in the uppermost or 12 o'clock position opposite the arrow 88 on the upper side of the cross-arm 14.

In operation, the spring 44 normally urges the valve plunger 30 into open position. To set the valve to shut off automatically, assuming that the chamber portion 56 has previously been emptied, as will be explained hereinafter, one of the metering orifices 70 . . . , 76 is registered with the lateral passage 54, thereby determining the rate at which fluid may enter the chamber portion 56. Thereafter when the sprinkler system, or other flow system, is turned on, liquid enters the inlet 16 and is discharged from the outlet 18.

Under these circumstances, the pressure of liquid above the mouth 34 depends upon the rate of flow, being a direct function of the rate of flow. For any given pressure, liquid enters the chamber portion 56 through the passage 48 and the orifice 70 . . . , or 76 that is registered therewith, the rate of entry being dependent upon the cross-sectional area of the registered orifice. As the liquid continues to flow through the line, pressure is built up in the chamber portion 56 until it finally exceeds such a predetermined value that the pressure overcomes the force of the springs 43, permitting the fluid in the chamber 56 to force the plunger to the left, thereby shutting off the flow.

Thereafter, to reset the cut off valve for operation, the dial 66 is turned to open the outlet 57 and to close the lateral opening 54, thereby relieving the pressure in the chamber portion 56 and permitting the spring 44 to return the plunger 30 to its open position. The force required of the spring 44 to return the plunger 30 is relatively small because the sinks 42 in which the detents 36 rest in the closed position are relatively small.

It will be noted that the pressure at the inlet side of the mouth 24 varies as a direct function of the rate of flow of liquid in the line, the rate of flow increasing as the pressure increases. Under these circumstances, the rate of flow of liquid through the orifice registered with the lateral opening 54 is also a direct function of the rate of flow of liquid through the line. For this reason, if the rate of flow is large, the time required for the valve to shut off is small, but if the rate of flow is low, the time required for the valve to shut off is long. Thus, the system, at least over a substantial range, is self-compensating, permitting the valve to shut off after a predetermined quantity of fluid has flowed through it irrespective of the line pressure in that range. The relative quantities of fluid or valve-closing times are indicated by the legends 5, 10, etc. on the dial 66, these legends, for example, being selected to indicate the number of minutes the valve remains open for average line pressure.

In the particular embodiment of the invention that has been described above, liquid is discharged from the chamber portion 56 directly to the exterior. If this is objectionable, an auxiliary passage 90 formed in a blister 92 may be employed to cause the liquid to discharge into the outlet end 18 of the valve body, as shown in Fig. 7. In either case, the passages 47, 57 and 90 are arranged on what would normally be the lower side of the valve.

Although only two particular forms of my invention have been specifically disclosed, it will be obvious that my invention is not limited thereto, but is capable of being embodied in many forms. Accordingly, various changes which will now suggest themselves to those skilled in the art may be made in the material, form, details of construction, and arrangement of the elements without departing from the principles of my invention. For example, the internal wall of the cross-arm and the valves may be ground or lapped to minimize the danger of leakage and in this case the packing rings may be omitted.

I claim:

1. In a cut off valve, a valve body having an inlet and an outlet at opposite ends thereof, said valve body having a cylindrical valve chamber arranged between said inlet and said outlet; a valve plunger fit closely within said valve chamber so as to provide a closed expansion chamber at one end thereof, said valve plunger being reciprocable within said valve chamber between an open position in which said expansion chamber is contracted and a closed position in which it is expanded, said valve plunger having a passage for establishing communication between said inlet and said outlet when said plunger is in open position, said valve plunger blocking communication between said inlet and said outlet when in closed position; passage means establishing communication between said inlet and said expansion chamber for building up pressure in said expansion chamber as fluid flows through said valve body; means for yieldably retaining said valve plunger in open position with a force which may be overcome by pressure in said expansion chamber in excess of a predetermined value; means for urging said valve plunger from closed position to open position; means for adjusting the flow resistance of said passage means so that the time elapsed before said predetermined pressure value is exceeded may be varied; and means for relieving the pressure of fluid in said pressure chamber.

2. In a cut off valve, a valve body having an inlet and an outlet at opposite ends thereof, said valve body having a cylindrical valve chamber arranged between said inlet and said outlet; a valve plunger fit closely within said valve chamber so as to provide a closed expansion chamber at one end thereof, said valve plunger being reciprocable within said valve chamber between an open position in which said expansion chamber is contracted and a closed position in which it is expanded, said valve plunger having a passage for establishing communication between said inlet and said outlet when in open position, said valve plunger blocking communication between said inlet and said outlet when in closed position; passage means establishing communication between said inlet and said valve expansion chamber for building up pressure in said valve chamber as fluid flows through said valve body; means for yieldably retaining said valve plunger in open position with a force which may be overcome by pressure in said expansion chamber in excess of a predetermined value; means for urging said valve plunger from closed position to open position; and a rotary member arranged within said expansion chamber, said rotary member having a series of orifices of different sizes operatively arranged to be selectively registered with the discharge end of said passage means for adjusting the flow resistance of said passage means so that the time elapsed before said predetermined pressure value is exceeded may be varied, said rotary member having valving means for relieving the pressure of liquid fluid in said chamber.

3. In a cut off valve, a valve body having an inlet and an outlet at opposite ends thereof, said valve body having a cylindrical valve chamber arranged therein between said inlet and said outlet, the inner wall of said valve chamber being provided with a pair of axially spaced ball detent receiving means; a valve plunger fit closely within said valve chamber so as to provide a closed expansion chamber at one end thereof, said valve plunger being reciprocable within said valve chamber between an open position in which said expansion chamber is contracted and a closed position in which it is expanded, said valve plunger having a passage for establishing communication between said inlet and said outlet when in open position, said valve plunger blocking communication between said inlet and said outlet when in closed position; passage means establishing communication between said inlet and said expansion chamber for building up pressure in said valve chamber as fluid flows through said valve body; means for urging said valve plunger from closed position to open position; ball detent means carried by said plunger valve and engageable with said receiving means for maintaining said valve plunger in open position until said pressure exceeds said predetermined value whereupon said valve plunger moves in one direction to a closed position and for limiting such movement; means for adjusting the flow resistance of said passage means so that the time elapsed before said predetermined pressure value is exceeded may be adjusted; means for relieving the pressure of fluid in said pressure chamber.

4. In a cut off valve, a valve body comprising a pair of crossing cylindrical body portions, one of said body portions having an inlet and an outlet at opposite ends thereof, the other body portion providing a valve chamber arranged between said inlet and said outlet, said valve chamber having a pair of lateral openings in one end thereof; a valve plunger fit closely within said valve chamber so as to provide a closed expansion chamber at said end, said valve plunger being reciprocable within said valve chamber between an open position in which said expansion chamber is contracted and a closed position in which it is expanded, said valve plunger having a passage for establishing communication between said inlet and said outlet when in open position, said valve plunger blocking communication between said inlet and said outlet when in closed position; passage means establishing communication between said inlet and one of said lateral openings for building up pressure in said expansion chamber as fluid flows through said valve body; means for yieldably retaining said valve plunger in open position with a force which may be overcome by pressure in said expansion chamber in excess of a predetermined value; a compression spring arranged within the other end of said valve chamber for urging said valve plunger from closed position to open position; and a rotary valve member arranged within said one end of said chamber, said rotary member having two orifices therein, said rotary member being operable to selectively cause registration of one of said orifices with one of said lateral openings and the other of said orifices with the other of said lateral openings.

5. In a cut off valve, a valve body comprising a pair of crossing cylindrical body portions, one of said body portions having an inlet and an outlet at opposite ends thereof, the other body portion providing a valve chamber arranged between said inlet and said outlet, said valve chamber having a pair of lateral openings in one end thereof; a valve plunger fit closely within said valve chamber so as to provide a closed expansion chamber at said end, said valve plunger being reciprocable within said valve chamber between an open position in which said expansion chamber is contracted and a closed position in which it is expanded, said valve plunger having a passage for establishing communication between said inlet and said outlet when in open position, said valve plunger blocking communication between said inlet and said outlet when in closed position; passage means establishing communication between said inlet and one of said lateral openings for building up pressure in said expansion chamber as fluid flows through said valve body; means for yieldably retaining said valve plunger in open position with a force which may be overcome by pressure in said expansion chamber in excess of a predetermined value; a compression spring arranged within the other end of said valve chamber for urging said valve plunger from closed position to open position until the pressure in said expansion chamber exceeds a predetermined pressure; and a rotary valve member arranged within said expansion chamber, said rotary member having a series of orifices of different sizes operatively arranged to be selectively registered with said one lateral opening for adjusting the time elapsed before said predetermined pressure value is exceeded, said rotary member also having an orifice registrable with the other lateral opening for relieving the pressure of fluid in said chamber.

6. In a cut off valve, a valve body comprising a pair of crossing cylindrical body portions, one of said body portions having an inlet and an outlet at opposite ends thereof, the other body portion providing a valve chamber arranged between said inlet and said outlet, said valve chamber having a pair of axially displaced lateral openings in one end thereof; a valve plunger fit closely within said valve chamber so as to provide a closed expansion chamber at said end, said valve plunger being reciprocable within said valve chamber between an open position in which said expansion chamber is contracted and a closed position in which it is expanded, said valve plunger having a passage for establishing communication between said inlet and said outlet when in open position, said valve plunger blocking communication between said inlet and said outlet when in closed position; passage means establishing communication between said inlet and one of said lateral openings for building up pressure in said valve chamber as fluid flows through said valve body; means for yieldably retaining said valve plunger in open position with a force which may be overcome by pressure in said expansion chamber in excess of a predetermined value; a compression spring arranged within the other end of said valve chamber for urging said valve plunger from closed position to open position, and a rotary valve member arranged within said expansion chamber and having a rotatable stem projecting axially from the end of said chamber, said rotary member having a series of metering orifices of different sizes so positioned and arranged thereon as to be selectively registered with said one lateral opening for adjusting the time elapsed before said predetermined pressure is exceeded, said rotary member also having an orifice displaced axially from the plane of said metering orifices and registrable with the other lateral opening for relieving the pressure of fluid in said chamber.

7. In a cut off valve, a valve body comprising a pair of crossing cylindrical body portions having an inlet and an outlet at opposite ends of one of said body portions, the other body portion providing a valve chamber arranged between said inlet and said outlet, said valve chamber having a pair of lateral openings in one end thereof, said other body portion being formed with a groove therein having first and second sinks at opposite ends thereof; a valve plunger fit closely within said valve chamber so as to provide a closed expansion chamber at said end, said valve plunger being reciprocable within said valve chamber between an open position in which said expansion chamber is contracted and a closed position in which it is expanded, said valve plunger having a passage for establishing communication between said inlet and said outlet when in open position, said valve plunger blocking communication between said inlet and said outlet when in closed position; passage means establishing communication between said inlet and one of said lateral openings for building up pressure in said expansion chamber as fluid flows through said valve body; a ball detent mounted on said valve plunger and adapted to slide in said groove and rest in one of said sinks, when said valve plunger is in open position and in the other sink when said valve plunger is in closed position, whereby said valve plunger remains in open position until said pressure exceeds such a predetermined value as to move said valve plunger from said open position to said closed position; a compression spring arranged within the other end of said valve chamber for urging said valve plunger from closed position into open position when the pressure in said expansion chamber is relieved; and a rotary valve member arranged within said one end of said chamber, said rotary member having two orifices therein operable selectively to cause registration of one of said orifices with one of said lateral openings to establish communication between said one lateral opening and said inlet and to cause registration of the other of said orifices with the other lateral opening to relieve the pressure in said expansion chamber.

References Cited in the file of this patent

UNITED STATES PATENTS

| 893,325 | Jewell | July 14, 1908 |
| 2,224,508 | Burroughs | Dec. 10, 1940 |

FOREIGN PATENTS

| 375,451 | France | May 14, 1907 |